United States Patent [19]

Émond et al.

[11] Patent Number: 5,727,711
[45] Date of Patent: Mar. 17, 1998

[54] REUSABLE CONTAINERS FOR THE PRESERVATION OF FRESH FRUITS AND VEGETABLES

[75] Inventors: Jean-Pierre Émond, Lac Beauport; Clément Vigneault, St./Luc, both of Canada

[73] Assignees: Her Majesty in right of Canada, as represented by the Minister of Agriculture and Agri-Food Canada; Laval University, both of Canada

[21] Appl. No.: 760,105

[22] Filed: Dec. 3, 1996

[51] Int. Cl.[6] .................................................. B65D 6/08
[52] U.S. Cl. .................. 220/676; 220/913; 220/DIG. 27
[58] Field of Search .................................. 220/572, 676, 220/DIG. 27, 913

[56] References Cited

U.S. PATENT DOCUMENTS

| | | | |
|---|---|---|---|
| 423,740 | 3/1890 | Coons | 220/572 |
| 849,165 | 4/1907 | Schneider | 220/572 |
| 1,017,455 | 2/1912 | Otto | 220/572 |
| 1,045,290 | 11/1912 | Holbert | 220/572 |
| 1,103,169 | 7/1914 | Beam | 220/572 |
| 1,469,371 | 10/1923 | Abrams | 220/572 |
| 4,105,117 | 8/1978 | Atkin et al. | 206/501 |
| 4,175,691 | 11/1979 | Cornell et al. | 229/36 |
| 4,709,852 | 12/1987 | Stoll | 229/119 |
| 4,789,075 | 12/1988 | Sun | 220/4 |
| 5,121,877 | 6/1992 | Bodary et al. | 229/120 |
| 5,366,107 | 11/1994 | Rostkowski | 220/676 |
| 5,515,987 | 5/1996 | Jacques et al. | 220/6 |

FOREIGN PATENT DOCUMENTS

| | | |
|---|---|---|
| 340167 | 3/1934 | Canada. |
| 760788 | 6/1967 | Canada. |
| 1008408 | 4/1977 | Canada. |
| 2009756 | 12/1990 | Canada. |
| 2133000 | 3/1996 | Canada. |
| 2155783 | 4/1996 | Canada. |

*Primary Examiner*—Joseph M. Moy
*Attorney, Agent, or Firm*—Thompson Hine & Flory LLP

[57] ABSTRACT

A durable container for storing and transferring crops, such as fruits and vegetables, from the field to market is described. The container is adapted to provide efficient air or water circulation for the preservation of crops. Particularly, the container contains openings in the floor and the sides of the container, which are of a defined size and proportion of the total area, to allow for effective air or water circulation.

15 Claims, 10 Drawing Sheets

- Lima Bean/25mm water, 0.7l/s*kg
- String Bean/25mm water, 2.0l/s*kg
- Peas in Pod/25mm water, 1.8l/s*kg
- Orange/25mm water, 3.0l/s*kg
- Potato/1.25mm water, 0.6l/s*kg
- Yam/Sweet potato/1.25mm water, 0.9l/s*kg
- Green Pepper/1.25mm water, 1.2l/s*kg

REUSABLE CONTAINERS FOR THE PRESERVATION OF FRESH FRUITS AND VEGETABLES

The present invention relates to a durable container for storing and transferring crops, such as fruits and vegetables, from the field to market. More particularly the present invention relates to a reusable, stackable container which is adapted to provide efficient air or water circulation for the preservation of crops.

BACKGROUND OF THE INVENTION

Containers for storing and transporting produce have been used in the fruit and vegetable marketing industry for many years. In early years wooden boxes were used for the storage and shipment of produce. Wooden boxes however have many disadvantages and their use has been displaced by the use of corrugated cartons, particularly cartons which have been coated to resist moisture damage. More recently containers made of plastic materials have become more prevalent in the agri-food industry.

Many examples of these containers, whether they be plastic or corrugated cartons, contain vent holes for air circulation. Examples of corrugated cartons containing such vent holes can be found in Canadian Patent 340,167; Canadian Patent 1,008,408; Canadian Patent application 2,009,756 and U.S. Pat. No. 4,175,691. In addition, examples of plastic containers containing such vent holes can be found in U.S. Pat. No. 4,105,117; U.S. Pat. No. 5,366,107 and Canadian Patent application 2,155,783.

The prior art however, does not address the question of efficient and uniform cooling throughout the entire container. The prior art also does not address the question of efficient and uniform cooling when multiple containers are stacked, one upon another.

There is therefore a need for a reusable, durable and stackable container of optimal design to facilitate the use of a chilling fluid, such as air or water, for use in the agri-food industry to minimize losses due to spoilage.

There is also a need for a container, which may be used to transfer and store the produce from the field to market, thus avoiding excessive handling and the associated produce losses.

Even when chilling is provided by a fluid medium, such as water or air, the produce may also be packed in ice to minimize spoilage. Therefore, there is also a need for a container to facilitate circulation of the chilling fluid, while minimizing the loss of ice.

There is also a need for a container, which addresses the issue of cooling the produce, while also minimizing braising, bruising, or cutting of the produce.

SUMMARY OF THE INVENTION

The present invention relates to a durable container for storing and transferring crops, such as fruits and vegetables, from the field to market. More particularly the present invention relates to a reusable, stackable container which is adapted to provide efficient air or water circulation for the preservation of crops.

Thus according to the present invention there is provided a produce container comprising a horizontal floor portion and four adjoining vertical wall portions, wherein the floor portion comprises a plurality of openings smaller than or equal to 3.175 mm in width and from 6.35 to 40 mm in length, said openings covering approximately 3.5% and 5.5% of the container floor and wherein each of said walls comprise a plurality of openings from about 3.175 to 12.7 mm in width and from 6.35 mm to 40 mm in length, said openings covering approximately 20% and 30% of the container walls.

In a further embodiment of the present invention, the openings on the floor are about 3.175 mm in width and cover about 5.2% of the container floor.

Also according to the present invention, the openings on the walls are from about 3.4 mm to about 4.7 mm in width and cover about 25% of the container walls.

Further according to the present invention, the walls of the container are hinged, the said walls being hinged at a height of between 4.5 mm and 40 mm from the floor of the container; wherein the floor is substantially planar, with a slope of less than 6%.

In a further embodiment of the present invention the walls of the container are collapsible.

In a preferred embodiment of the present invention the openings have a curved edge, preferably with a radius of about 0.8 mm.

BRIEF DESCRIPTION OF THE DRAWINGS

These and other features of the invention will become more apparent from the following description in which reference is made to the appended drawings wherein.

DESCRIPTION OF PREFERRED EMBODIMENT

Figure 1:
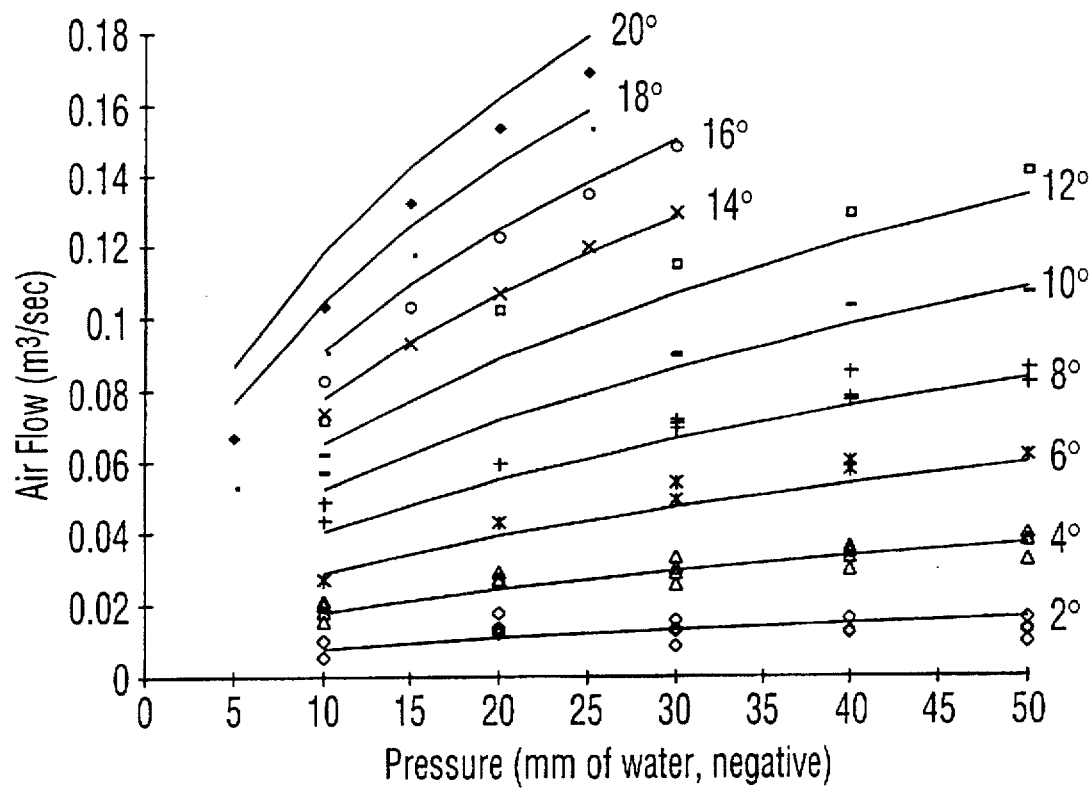
FIG. 1 depicts the relationship between air flow as a function of air pressure, through different angles of a V-shaped opening, 300 mm at the side and 1200 mm long.

The rate of chilling of the produce depends primarily on the temperature gradient between the chilling fluid, for example either air or water, and the produce to be chilled, as well as the rate of fluid flow around the produce. Where the chilling fluid has a uniform temperature, the rate of cooling will therefore depend on the distribution of fluid around the produce.

In the case of a water chilling system the design of the floor of the container is an important parameter for optimal chilling fluid distribution to minimize product spoilage. The size of the openings in the floor of the container and their distribution can greatly influence the flow of water through the produce in the container and the container below. The rate of water flow through a stack of containers will be influenced by the size of slits and the pressure head of the water flowing through the container stacks.

In the case of an air chilling system the design of opening dimensions on the walls, and the proportion of the openings in terms of the total surface area of the walls, of the container must be optimized. A further consideration is the angle of the vertical walls in the container, and the effect of the slope of the walls on air circulation.

When fluid cooling is used in conjunction with packed ice, the openings must be of a size to minimize ice loss.

The shape of the openings in the walls and on the floor of the container is also an important consideration, with respect to maintaining the quality of the produce.

The discussion of each of these parameters follows, with a view of optimizing the size and proportion of the openings to provide effective cooling of the produce.

Air Cooling

When air is used as a chilling medium, the size of the openings and the proportion of the openings in terms of total area must be optimized. In addition, the angle of the container sides required to achieve optimum air circulation needs to be determined.

Angle of the Container Sides

A box having a tunnel with an adjustable angle was made from 9.5 mm thick plywood. The inside dimensions of the box are: 305 mm wide by 305 mm high by 1200 mm long. The box is provided with a triangular, adjustable orifice so as to obtain the required restriction, thus simulating the presence of the product. The tunnel, made from a plywood panel 1200 mm long by 305 mm wide, is attached to the base of the box in longitudinal direction with the aid of a hinge. The tunnel is adjustable from 0° to 20°, thus simulating a box with inclined sides. The tunnel box system is attached to a plenum measuring 400 mm×400 mm×400 mm. A Delhi™, Model 612 squirrel-cage ventilator, activated by a variable-speed motor of 1 HP, is attached to the plenum. The ventilator draws its air from the side of the plenum and the pressure in a galvanized sheet steel pipe, 305 mm in diameter by 3050 mm long, is determined. A Pitot tube is installed in the galvanized pipe in order to measure the air flow. The air flow is calculated according to the method described in Ashrae, 1981. The plenum and Pitot tube are respectively connected to two pressure transducers which make data acquisition possible. The pressure transducers are connected to a computer which records the data via an interface card.

Tests were carried out by simulating the air loss passing in a tunnel between two boxes with inclined walls during forced-air precooling. According to the present invention, air loss is considered to be the air which does not pass through the inside of the packaging during precooling. The air flow passing through the tunnel was measured relative to the angle of the walls of the tunnel, for differences in pressure between the inlet and outlet of the tunnel. Readings of air flows were taken for ten angles of inclination of the tunnel walls and for five pressure losses. The pressure losses varied from 10 to 50 mm of water for the angles of inclination from 2° to 16°. For the angles from 180° to 200°, the ventilator did not have the capacity to exceed 25 mm of water. The pressure loss for the angles from 18° to 20° varied from 5 to 25 mm of water. For each angle of inclination, the air flow was adjusted so as to attain the required pressure loss.

FIG. 1 shows the effect of flow on the pressure difference for each aperture angle of the tunnel. The tests demonstrate the importance of the air loss for a container with inclined walls. The air loss for the assembly described above follows the following equation ($R^2=0.985$):

$$Q = e^{-6.7} \cdot P^{0.45} \cdot \alpha^{1.18}$$

where:

Q=Air flow passing in the tunnel, $m^3 \cdot sec^{-1}$

Figure 2:
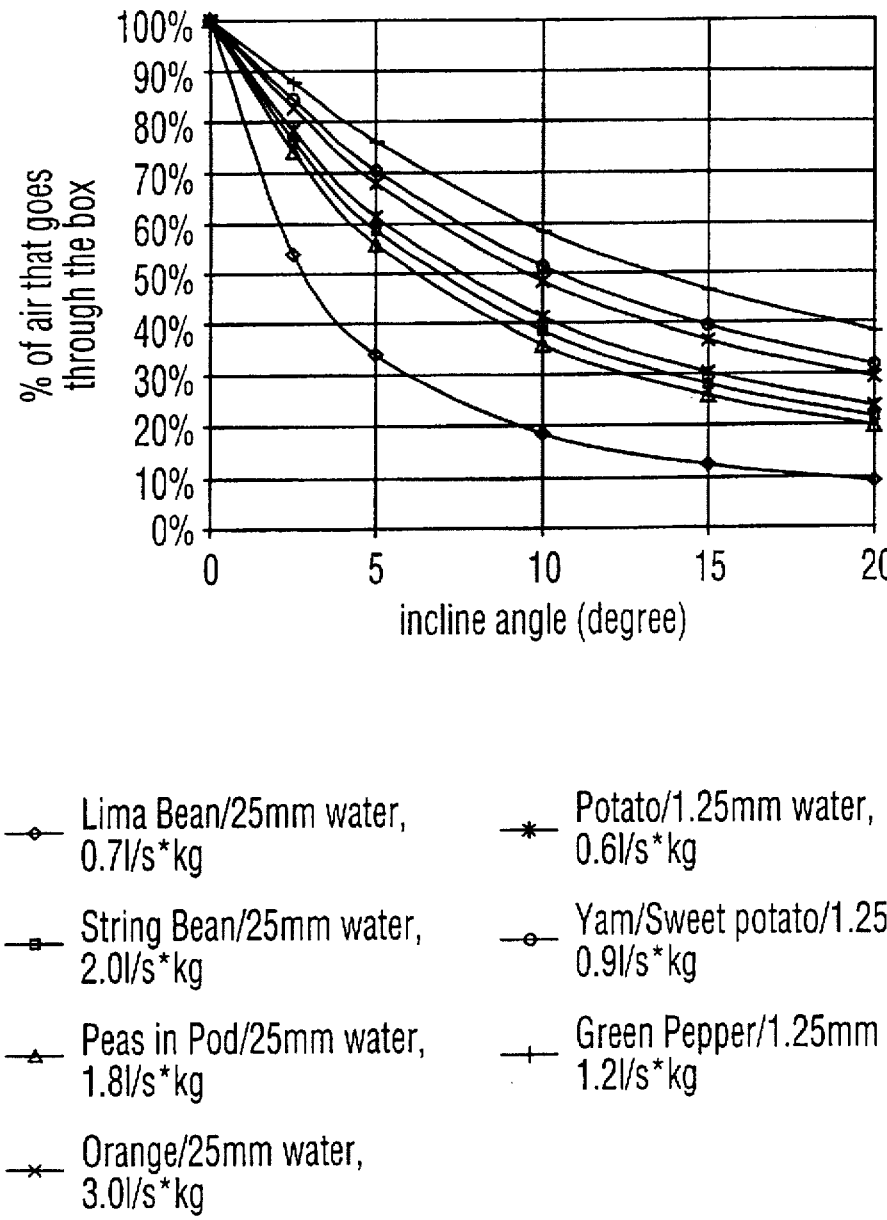
FIG. 2 shows the percentage of air that passed through the container packed with different produce having sides at an angle, of from 0° to 20°, from vertical.

P=Difference in pressure between the inlet of the tunnel and the plenum, mm of water α=Angle of the tunnel, degree FIGS. 1 and 2 demonstrate that the sides of the container must be vertical, with no degree of sloping, in order to ensure efficient air flow through the container. Increasing the angle of the walls in the container, beyond vertical, from 2° to 20°, resulted in a decrease in the air flow through the container walls. As shown in FIG. 2, this relationship was evident regardless of the type of produce packed in the container; for example, lima beans, string beans, peas in their pod, oranges, potatoes, sweet potatoes, or green peppers.

The air loss between the containers increases with the increase in the angle of inclination of the walls, which considerably reduces the efficiency of a forced-air precooling system. Thus, for forced air pre-cooling, it is preferable to avoid containers having inclined sides.

Width of the Openings on the Container Walls

Four different plates with 4 different widths of openings were fabricated to study the optimum width of openings for the sides of the container, in terms of air circulation.

A ventilator is attached to a galvanized steel pipe which is used to support various plates. Four Lexan plates 254 mm in diameter by 3.175 mm thick were made to obtain four different slit sizes.

It was necessary to make a support to position the plates during the tests. This support consists of a galvanized steel pipe 305 mm in diameter and 800 mm long. A plywood ring, 19 mm thick by 19 mm wide, was made and attached to the inside of the galvanized pipe to hold the Lexan plates in position. Using this assembly, the air does not have any other path in which to travel, other than the slits through the plates.

The ventilating system, as well as the data acquisition, is the same as that described above. In these tests the pressure loss is determined as the pressure difference between the inlet of the plate support and the inside of the galvanized pipe, just in front of the ventilator.

Figure 3:
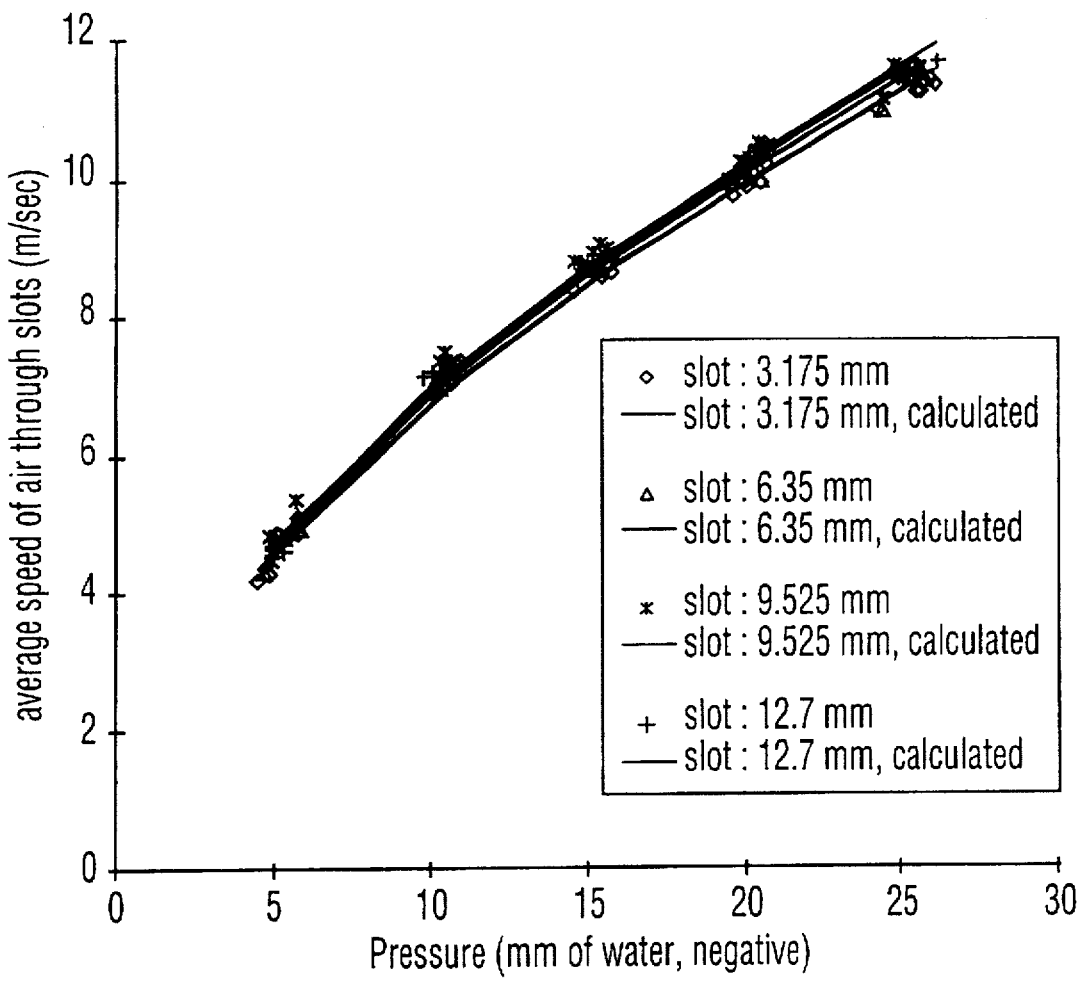
FIG. 3 shows the average speed of air travelling through the openings, as a function of the pressure, for plates with openings of 3.175, 6.35, 9.525 and 12.7 mm in width.

For each plate, the air flow was adjusted to attain five pressure losses varying from 5 mm to 25 mm of water. FIG. 3 shows the average speed of air travelling through the openings, as a function of the pressure, for plates with openings of 3.175 mm, 6.35 mm, 9.525 mm and 12.7 mm in width. FIG. 3 clearly shows that there is very little difference between this relationship regardless of the width of the openings in the experimental plates.

It is demonstrated that, for the same pressure differential, the effect of the opening width on the average speed of air flow is negligible. The average speed of air flow through the openings is determined by the following equation ($R^2$-0.997):

$$V = e^{0.6} \times P^{0.5577} \times L^{0.0213};$$

where:

V is the average speed of the air passing through the openings, measured in meters per second;

P is the pressure differential, in mm of water; and

L is the width of the opening in mm.

The calculated values, based on the above formula, are also shown in FIG. 3. For the same pressure loss, air flowing through a plate with openings which are 12.7 mm wide will have an average air speed of only 3% greater than air flowing through a corresponding plate with openings which are 3.175 mm wide, a negligible difference. Therefore, in terms of air circulation through the container, the width of the openings is a factor that does not have to be considered. In these experiments, the proportion of the openings in terms of the total surface area of the wall was kept constant at 25%.

Thus, the size of the slits does not have a significant effect on the loss in pressure of the air circulating through the slits, the openings of which vary from 3.175 mm (⅛") to 12.7 mm (½"). All of the openings between 3.175 mm and 12.7 mm can be used with respect to the air precooling systems.

Percentage of the Openings on the Walls, in Terms of the Total Wall Surface Area The pressure drop of the air, measured in mm of water, flowing through the openings of the walls of the container, was determined for openings ranging from 10% to 40%, in terms of the total surface area. In this study, the width of the opening was kept constant at 6.35 mm (¼ inch) and the air flow through the walls of the container was 0.05 mm³ per second.

To determine, in terms of the total surface area, the impact of the proportion of the openings on air pressure, the following formula was used to calculate the average speed of the chilling air:

$$V = Q/A$$

where:

V is the average air speed in meters per second;

Q is the rate of air flow in m³ per second; and

A is the total surface area of the openings in meter².

Figure 4:
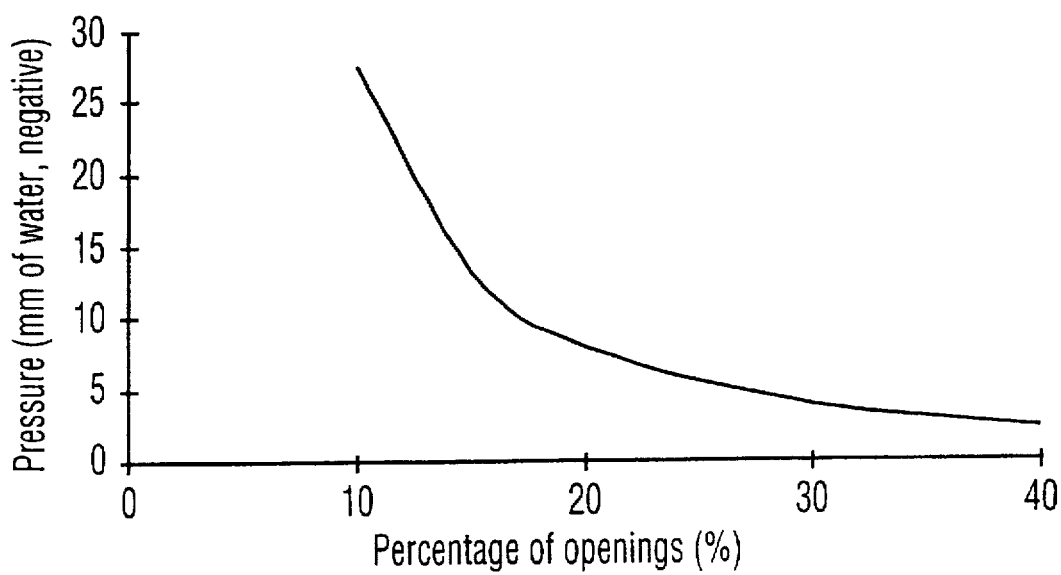
FIG. 4 shows the pressure drop of the air, measured in mm of water, flowing through the openings of the walls of the container as a function of the proportion of opening ranging from 10% to 40%, in terms of the total surface area. The width of the openings was kept constant at 6.25 mm (¼ inch) and the air flow through the walls of the container was 0.05 $mm^3$ per second.

The loss of pressure is illustrated in FIG. 4, as a function of air speed for each ratio of openings. From these results it is recommended that the percentage of openings in the walls, in terms of the total surface area of the walls, range from 20% to 30%. In a preferred embodiment of the invention, it is recommended that the percentage of openings in the walls, in terms of the total surface area of the walls, be about 25%.

Water Cooling

When water is used as a liquid coolant, the optimumal size of the openings on the floor of the container must be determined. The containers of the present invention are adapted to be used in a stacked configuration. Thus during the cooling process, if water is used as a coolant, the size and the proportion of the openings on the floor of the container will influence the water distribution through the stack.

As with the wall experiments, discussed above, disks with different widths and lengths of openings were used to study the effect of water flow and distribution through the disks.

The assembly used is primarily composed of a Lexan plate, a support plate, a pump and a water basin. Slits of different sizes were perforated on two plates, 254 mm in diameter by 3.175 mm thick, to be used during the tests. The different widths of the slits evaluated on the first plate were: 1.5875 mm, 3.175 mm, 6.35 mm, 9.525 mm and 12.7 mm. The open surface of each of these slits was constant, namely 161.29 mm².

A second plate with slits of different lengths, namely 3.175 mm, 6.35 mm, 12.7 mm and 25.4 mm, was also made. The width of all of the slits on this plate was 3.175 mm.

During the tests, a U-shaped tube was connected to a perforated hole in each of the two plates and indicated the height of the water level above the plate.

The plate support consists of a galvanized steel pipe 300 mm in diameter by 230 mm in length. To keep the plate in position, a plywood ring 25.4 mm, thick and 235 mm in inside diameter is located inside the support, thus the water can only pass through the slits of the plate tested. This plate support was attached to three wood supports which maintain it sufficiently high to permit the determination of water flow running through each hole.

The water was first pumped from the basin located above the plate support. Then, it was conveyed above the plate to be evaluated with aid of a pipe. Several water levels were selected in each test. At the start, the water flow from the pump was adjusted with aid of a valve until the minimum water level was obtained. To enable measurement of the flow through these slits having specific dimensions, only the slits desired were left open during the tests. All of the other slits of the same plate were obstructed by adhesive tape. A container was then placed above a single slot at the same time. The quantity of water passing through this slit was then collected and measured with the aid of a digital precision balance to within ±0.005 kg, and the water flow was then calculated. Next, the second water level was adjusted by opening the valve and a second series of measurements were taken on the different slit sizes. After the measurements were taken on all of the different water levels, the water level was readjusted for the subsequent measurement series. A total of three measurement series were done. In this manner stable experimental conditions for each water level in a series of measurements were obtained.

Widths of the Openings on the Container Floor

Tests were done on a plate having slits with an opening surface of 161.29 mm². Five slits with a width of 1.5875 mm, 3.175 mm, 6.35 mm, 9.525 mm and 12.7 mm were left open at the same time during these tests. Five water levels were selected: 5 mm, 10 mm, 20 mm, 30 mm and 40 mm. Water volume measurements were taken for a duration of 30 seconds, or 15 seconds in the case where the amount of water was very large. A total of 75 tests were performed; that is, 3 repetitions for 5 different widths×5 different heights.

Figure 5:
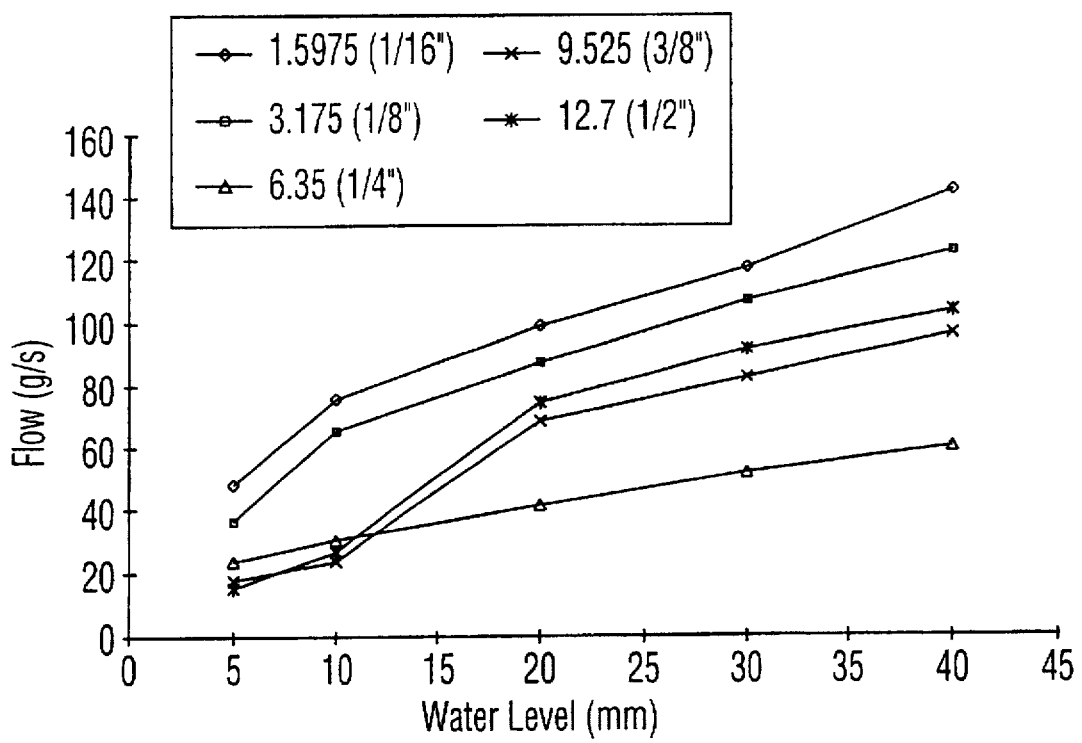
FIG. 5 shows the effects of the width of holes on water flow in gallons per second (g/s), as a function of the height of the water in millimeters.

Table 1 shows the effect of the hole width on the water flow in terms of 4 g/s (gallons per second), as a function of the height of the water level in mm. The same results are also depicted in FIG. 5. By the term water height it is meant to refer to the height of the standing water in the bottom of the container, also referred to herein as water level.

Five different holes with opening widths of 1.5975 mm (1/16 inch); 3.175 mm (1/8 inch); 6.35 mm (1/4 inch); 9.525 (3/8 inch); and 12.7 mm (1/2 inch) were tested. When the opening widths were greater than 3.175 mm water passed through the openings forming a vortex. In the present invention, a vortex is to be avoided. If there is a vortex there will be a significant decrease in water circulation creating differences in water distribution. Thus it is recommended that the width of the openings in the floor portion of the container be 3.175 mm or smaller.

TABLE 1

Water flow (g/s) as a function of the height of the water (mm) for different sizes of holes in a total area of 161.29 mm².

| Width | Water flow as a function of the water height | | | | |
|---|---|---|---|---|---|
| | 5 | 10 | 20 | 30 | 40 |
| 1.5975 (1/16") | 46.9 | 75.3 | 97.8 | 118.4 | 141.6 |
| | 47.5 | 76.4 | 98.8 | 115.4 | 141.8 |
| | 48.4 | 76.3 | 99.1 | 117.6 | 142.3 |
| Average | 47.6 | 76.0 | 98.6 | 117.1 | 141.9 |
| 3.175 (1/8") | 36.1 | 64.7 | 86.9 | 105.7 | 121.2 |
| | 36.1 | 65.6 | 88.5 | 106.0 | 122.6 |
| | 36.36 | 65.6 | 87.1 | 107.4 | 123.1 |
| Average | 36.2 | 65.3 | 87.5 | 106.4 | 122.3 |
| 6.35 (1/4") | 23.4 | 31.1 | 41.3 | 51.4 | 60.5 |
| | 23.4 | 30.7 | 42.9 | 51.6 | 59.6 |
| | 23.3 | 29.7 | 40.2 | 51.7 | 60.1 |
| Average | 23.4 | 30.5 | 41.5 | 51.6 | 60.1 |
| 9.525 (3/8") | 17.9 | 24.3 | 68.1 | 82.0 | 95.4 |
| | 17.7 | 23.2 | 68.4 | 82.9 | 96.4 |
| | 17.6 | 23.1 | 68.9 | 83.1 | 96.8 |
| Average | 17.7 | 23.5 | 68.5 | 82.7 | 96.2 |
| 12.7 (1/2") | 14.3 | 26.6 | 75.7 | 89.8 | 103.2 |
| | 15.5 | 26.5 | 73.9 | 92.0 | 104.3 |
| | 15.5 | 26.4 | 73.7 | 92.2 | 102.9 |
| Average | 15.1 | 26.5 | 74.4 | 91.3 | 103.5 |
| Vortex | | | | | |

If wider openings in the bottom of the container are used, there are means which can be used to avoid a vortex effect. For example, the produce itself, as it is packed in the container will result in some blockage of the holes, reducing the vortex effect. However, this effect would not be uniform, and thus it is not preferred to rely on the produce to eliminate or reduce water vortexing.

Alternatively, any vortexing of the water can be eliminated if a grill or a screen is placed in the bottom of the container. As shown in Table 2, the vortex was eliminated in plates with openings wider than 3.175 mm when a grill was placed over the openings, about 5 mm above the openings.

TABLE 2

Comparison of the water flow with or without a screen for different widths of openings with state area of 161.29 mm² (0.25 ft²)

| | Width | Water flow as a function of the water height | | | | |
|---|---|---|---|---|---|---|
| | | 5 | 10 | 20 | 30 | 40 |
| Without a screen | 1.5975 (1/16") | 47.6 | 76.0 | 98.6 | 117.1 | 141.9 |
| | 3.175 (1/8") | 36.2 | 65.3 | 87.5 | 106.4 | 122.3 |
| | 6.35 (1/4") | 23.4 | 30.5 | 41.5 | 51.6 | 60.1 |
| | 9.525 (3/8") | 17.7 | 23.5 | 68.5 | 82.7 | 96.2 |
| | 12.7 (1/2") | 15.1 | 26.5 | 74.4 | 91.3 | 103.5 |
| With a screen | 1.5975 (1/16") | 53.8 | 71.0 | 97.6 | 119.7 | 133.8 |
| | 3.175 (1/8") | 48.1 | 65.7 | 88.8 | 105.5 | 121.9 |
| | 6.35 (1/4") | 43.2 | 58.6 | 75.0 | 92.7 | 103.7 |
| | 9.525 (3/8") | 41.1 | 56.0 | 73.4 | 85.5 | 96.5 |
| | 12.7 (1/2") | 45.9 | 58.7 | 73.7 | 89.4 | 98.5 |
| Vortex | | | | | | |

Despite the fact that there are ways of avoiding or reducing any vortex, it is preferred according to the present invention that the width of the openings in the bottom portion of the container be no larger than 3.175 mm, to ensure a uniform flow of water through the floors of the containers. In one embodiment of the present invention, it is preferred that the width of the openings range from 1.5975 mm (1/16 inch) to 3.175 mm (1/8 inch).

Length of the Openings in the Container Floor

Figure 6:
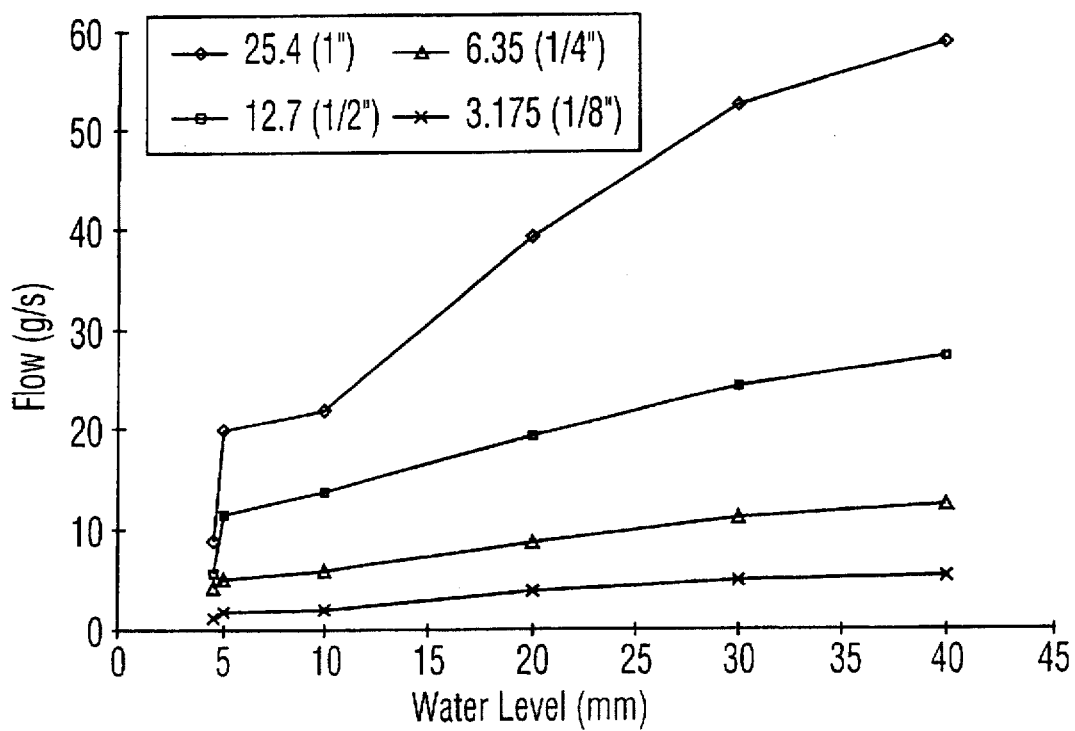
FIG. 6 shows the rate of water flow, as a function of water height, for different lengths of floor openings: 25.4 mm (1 inch); 12.7 mm (½ inch); 6.35 mm (¼ inch); and 3.175 mm (⅛ inch).

In these experiments, a series of 4 plates with openings of a constant width of 3.175 mm and varying lengths were used to test water flow through the openings. The rate of water flow, as a function of the water height, for different lengths of floor openings: 25.4 mm (1 inch); 12.7 mm (1/2 inch); 6.35 mm (1/4 inch); and 3.175 mm (1/8 inch) are shown in Table 3 and FIG. 6. For water heights between 10 mm and 40 mm, the rate of water flow increases linearly for openings of the same length. A water height greater than or equal to 10 mm is optimal to provide a flow of water horizontally over the floor surface.

TABLE 3

Water flow (g/s) as a function of the height of the water for different lengths of openings

| Length of holes | Water level above opening (mm) | | | | | |
|---|---|---|---|---|---|---|
| (mm) | 4.5 | 5 | 10 | 20 | 30 | 40 |
| 25.4 (1") | 8.64 | 21.53 | 21.57 | 39.37 | 52.59 | 60.27 |
| | | 21.16 | 22.03 | 39.06 | 52.49 | 58.69 |
| | 8.78 | 16.92 | 21.70 | 39.17 | 52.26 | 57.65 |
| | 8.77 | | | | | |
| Average | 8.73 | 19.87 | 21.77 | 39.20 | 52.45 | 58.87 |
| 12.7 (1/2") | 5.94 | 11.48 | 13.64 | 19.21 | 24.32 | 27.10 |
| | 5.55 | 11.49 | 12.52 | 19.15 | 24.25 | 27.18 |
| | 5.48 | 11.45 | 13.50 | 19.07 | 24.24 | 27.13 |
| Average | 5.66 | 11.44 | 13.56 | 19.14 | 24.27 | 27.14 |
| 6.35 (1/4") | 4.16 | 4.97 | 5.60 | 8.65 | 11.06 | 12.35 |
| | 4.12 | 4.95 | 5.97 | 8.62 | 10.97 | 12.18 |
| | 4.15 | 4.93 | 6.09 | 8.59 | 10.95 | 12.26 |
| Average | 4.14 | 4.95 | 5.89 | 8.62 | 10.99 | 12.26 |
| 3.175 (1/8") | 1.28 | 1.78 | 2.04 | 3.82 | 4.80 | 5.08 |
| | 1.34 | 1.79 | 2.02 | 3.77 | 4.82 | 5.13 |
| | 1.28 | 1.79 | 2.03 | 3.77 | 4.82 | 5.11 |
| Average | 1.30 | 1.79 | 2.03 | 3.79 | 4.81 | 5.11 |

Figure 7:
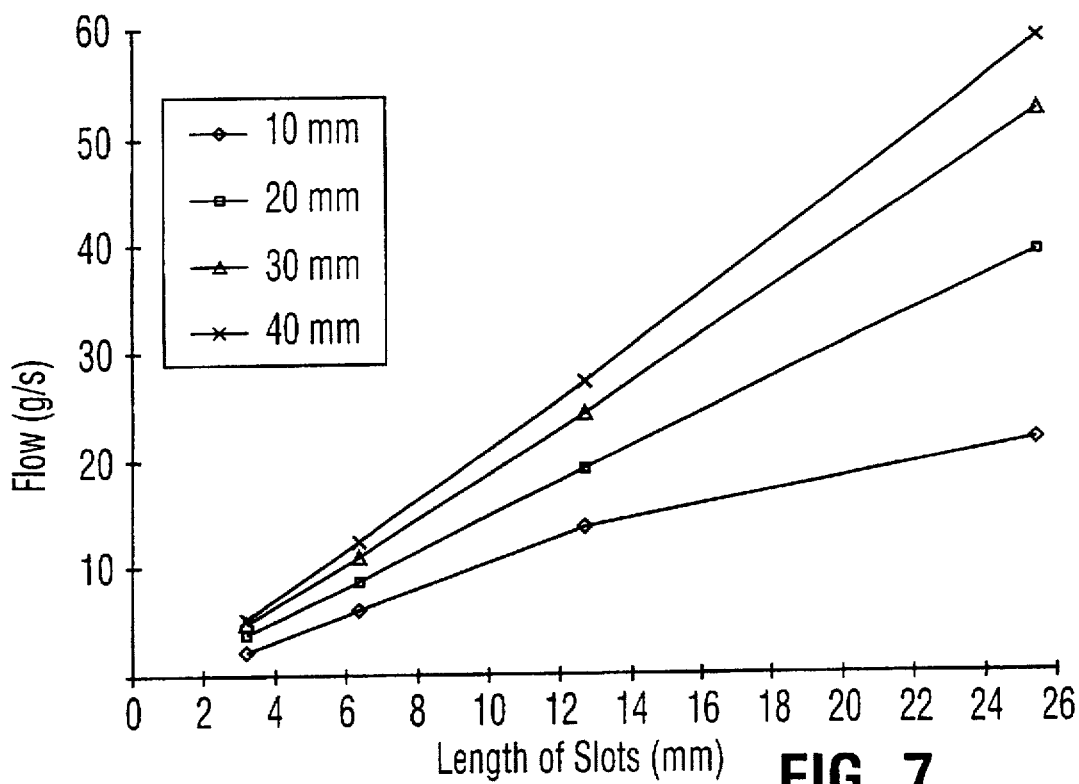
FIG. 7 shows the relationship between the length of the openings and the water flow.

The relationship between the length of the openings and the water flow is presented in Table 4 and FIG. 7. For a water height greater than 10 mm, the water flow varies in a linear fashion with the length of the openings (the same opening lengths were used as in the above experiment). For a water height greater than 10 mm, when the slit length is doubled, the water flow also approximately doubles. Thus, for a given percentage of opening, the length of the opening greater than 10 mm has no effect, or a negligible effect on the total water flow.

TABLE 4

Water flow (g/s) as a function of the height of the openings for different water levels

| Water Height | Water flow (g/s) vs the length (mm) of the openings | | | |
|---|---|---|---|---|
| | 25.400 | 12.700 | 6.350 | 3.175 |
| 10 mm | 24.76 | 13.56 | 5.89 | 2.03 |
| 20 mm | 39.2 | 19.15 | 8.62 | 3.78 |

TABLE 4-continued

Water flow (g/s) as a function of the height of the openings for different water levels

| Water Height | Water flow (g/s) vs the length (mm) of the openings | | | |
|---|---|---|---|---|
|  | 25.400 | 12.700 | 6.350 | 3.175 |
| 30 mm | 52.45 | 24.3 | 10.99 | 4.81 |
| 40 mm | 58.87 | 27.14 | 12.26 | 5.11 |

Proportion of Openings in the Floor, in terms of the Total Surface Area, to Optimize Water Flow According to Kader (1992), the rate of water flow for a chilling system should be between 15 and 25 gallons per square foot per minute (approximately 600 to 1000 liters per minute per meter$^2$).

Table 5 illustrates the relationship between the height of the water, the length of the openings and the proportion of the openings as a percentage of the floor surface area required for the recommended maximum flow rate. When using hinged walls in a collapsible container, the hinges have to be at a height on the wall greater than the height of the water, to avoid water loss by overflow. In the case of the present invention, it is desirable that the hinges be located at a height of 4.5 mm to 40 mm above the floor of the container and preferably from 10 mm to 20 mm.

According to Table 5, for water levels of 10 and 20 mm, and slit lengths of 6.35 mm and more, the percentage of opening in the bottom of the container becomes almost constant, depending on the different water heads. For slits having a width equal to or greater than 6.35 mm, the percentage of opening in the floor of the container is thus independent of the length of the slits used. For slits exceeding 40 mm in length, the possibility of making the water uniform over the entire surface of the container decreases by centralizing the water to a more restricted opening number. The resistance of the bottom of the container is also going to decrease. It is thus recommended that the openings be from 6.35 mm to 40 mm in length.

TABLE 5

Percentage of openings in the surface as a function of the length of the openings and the height of the water

| Water Height | | |
|---|---|---|
| 4.5 mm | 25.4 mm | 15.10% |
|  | 12.7 mm | 11.39% |
|  | 6.35 mm | 7.98% |
|  | 3.175 mm | 12.63% |
| 5 mm | 25.4 mm | 6.77% |
|  | 12.7 mm | 5.88% |
|  | 6.35 mm | 6.71% |
|  | 3.175 mm | 9.20% |
| 10 mm | 25.4 mm | 5.86% |
|  | 12.7 mm | 4.98% |
|  | 6.35 mm | 5.62% |
|  | 3.175 mm | 8.06% |
| 20 mm | 25.4 mm | 3.26% |
|  | 12.7 mm | 3.42% |
|  | 6.35 mm | 3.87% |
|  | 3.175 mm | 4.34% |
| 30 mm | 25.4 mm | 2.57% |
|  | 12.7 mm | 2.60% |
|  | 6.35 mm | 2.74% |
|  | 3.175 mm | 2.74% |
| 40 mm | 25.4 mm | 2.29% |
|  | 12.7 mm | 2.38% |

TABLE 5-continued

Percentage of openings in the surface as a function of the length of the openings and the height of the water

| Water Height | | |
|---|---|---|
|  | 6.35 mm | 2.46% |
|  | 3.175 mm | 2.55% |

Figure 8:
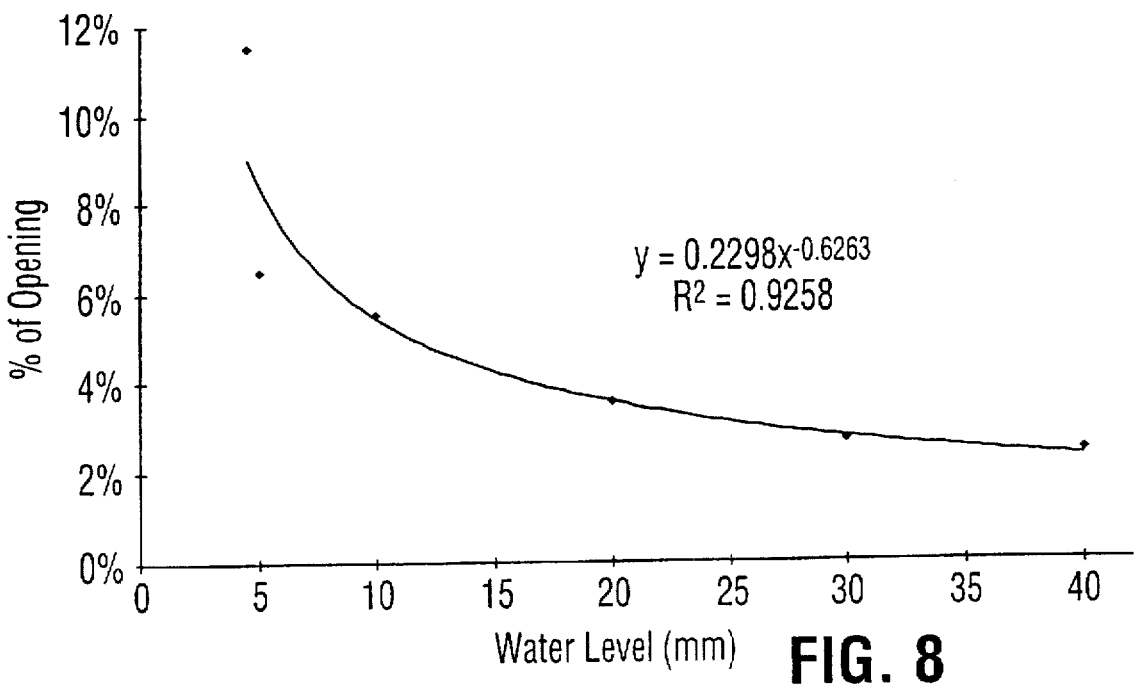
FIG. 8 shows the average percentage of openings in the bottom of a container, for slit lengths of 6.35 mm to 25.4 mm inclusive, for different water heights.

Table 6 and FIG. 8 show the average proportion of opening in the bottom of a container with openings of 6.35 mm to 25.4 mm in length. At a 10 mm water height, approximately 5.5% of floor openings (in terms of the total surface area) is required to achieve the maximum recommended rate of water flow. With a water height of 20 mm, a proportion of 3.5% of openings (in terms of the total surface area) is required to achieve the same rate.

TABLE 6

Percentage of openings to achieve a maximum recommended water flow with openings of 3.175 mm wide and from 6.35 to 25.4 mm long

| Height of Water (mm) | Percentage of Openings |
|---|---|
| 4.5 | 11.49% |
| 5 | 6.45% |
| 10 | 5.49% |
| 20 | 3.51% |
| 30 | 2.64% |
| 40 | 2.38% |

Proportion of Openings on the Container Floor, in Terms of the Total Surface Area, to Optimize Water Distribution With a uniform liquid temperature, the uniformity of the rate of cooling then depends on the uniformity of water distribution around the produce. Thus it is important to ensure that the design of the container of the present invention optimizes the distribution of the water around the produce. This is also an important factor when the containers are stacked, because one wants to ensure that the water that is introduced at the top of the stack is distributed evenly through the stack.

After having determined the size of the openings to be used and measured the effect of their length, one must then optimize the percentage of the surface of the floor to be used as an opening. Two factors should be considered when selecting a certain percentage of opening for the floors of plastic containers:

the distribution of water inside the container
the amount of water lost outside of the container The produce located in the container exposed to the least amount of chilling fluid will require more time to be chilled with an impact on produce quality; thus limiting the rate of chilling of the contents of the entire container. Additionally, optimal distribution of water through the container will minimize water losses through the openings near the sides.

Where the openings, in proportion to the total floor area, are restricted, excessive accumulation of water will result and water will overflow by the openings on the side walls. On the other hand, where the openings represent a very high proportion of the floor area, water losses at the container edge will be minimized, but this will not correct the poor distribution of water through the container. It is therefore desirable that water chilling takes place as quickly as possible and that swamping of the produce in the container by the chilling water be avoided, by maintaining the level of water on the container floor lower than any opening levels on the side walls.

Thus, the minimum amount of water which the produce receives should be measured as a performance index of a container for good distribution of water, in addition to the total amount of water which remains in the containers and the uniformity of the distribution of water inside the containers.

Two means of water distribution, with an aim of delivering the maximum recommended water flow rate of 600 to 1000 liter per minute per meter$^2$ (Kader, 1992), were studied; delivery of water by jet and delivery of water by sprinkler. To study water distribution, a container was used as shown in FIG. 9, divided in zones as shown therein.

Figure 9:
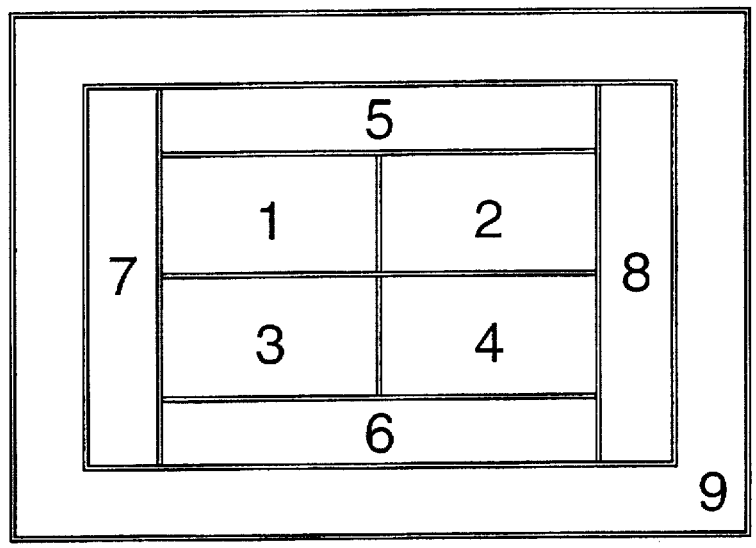
FIG. 9 shows the bottom portion of the container that was used to study the distribution of water in a container.

For delivery of water by way of jet, the water was provided at about 100 mm above and from the sides of the container, at approximately the intersection of zone 3, 6 and 7 (FIG. 9). For water delivered by spray, a different plastic container of the same internal dimensions was used, with the slits representing 3.5% of the floor surface and uniformly distributed over the plastic container floor surface.

The central portion of the container was divided into 8 sections of equal surface area, totalling the surface area of the floor. For ease of statistical analysis, the sections were grouped as follows:

- section 1, 3 and 7 are the proximal group;
- section 2, 4 and 8 are the distal group;
- section 5 and 6 are treated as separate sections for total water flow; and
- section 9 is the zone where water, which was lost to the sides, accumulates.

The distribution of water in the container is relevant to the design of the container floor. The distribution may be evaluated by studying the minimum quantity of water in the container and the percentage of water delivered which comes out in the peripheral sections.

Figure 10:
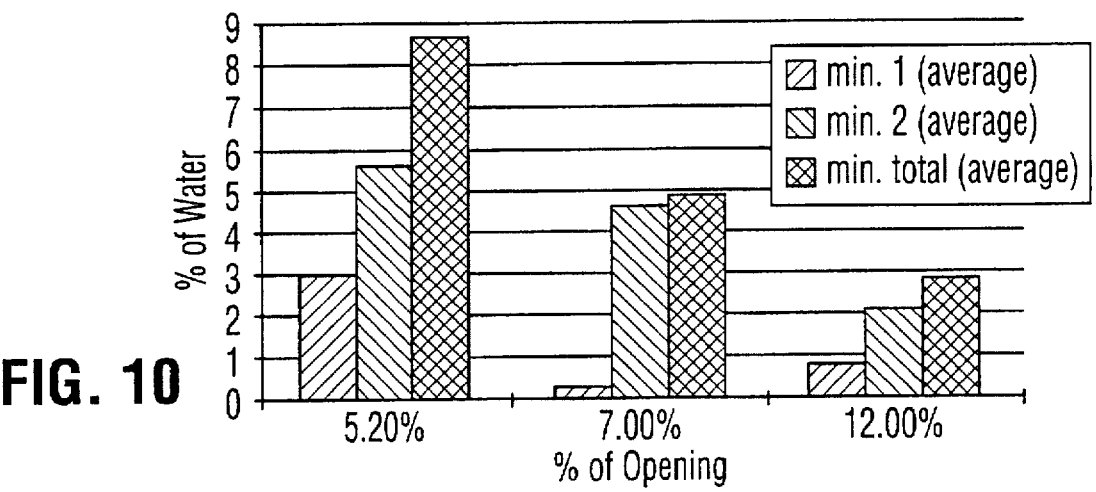
FIG. 10 shows the effect of the size of the openings, as expressed in terms of a percentage of the floor surface area and the amount of water retained in the container.

As seen in Table 7 and FIG. 10, the minimum quantity of water received by any section decreases with increasing proportion of slits to floor area. The containers in these studies were packed with various produce. In other words, there is more water flowing through the zone receiving the least mount of sprinkled water with a 5.2% ratio as compared to a 7% or 12% ratio.

TABLE 7

Minimum Quantities of Water Received by any Section as a Function of the Percentage of Floor Opening

|  | 5.2% | 7% | 12% |
| --- | --- | --- | --- |
| minimum 1 (average) | 2.98 | 0.28 | 0.78 |
| minimum 2 (average) | 5.65 | 4.63 | 2.05 |
| Total minimum amount of water (average) | 8.63 | 4.90 | 2.83 |

Figure 11:
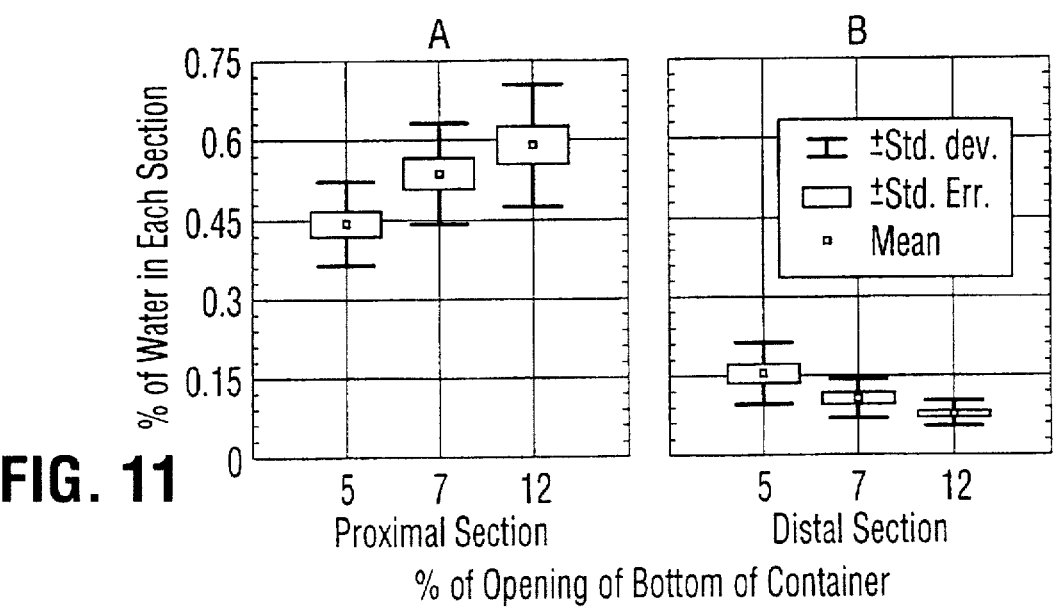
FIG. 11 illustrates the percentage of water that was accumulated in the proximal area (FIG. 11A) and in the distal area (FIG. 11B) as a function of the proportion of the slit openings in the floor of the container.

FIG. 11A illustrates the percentage of water that accumulated in the proximal section as a function of the proportion of the openings to total floor area. About 30% more water was accumulated in the proximal section with a 12% ratio compared to the 5.2% ratio, to the detriment of the distal section. As can be seen in FIG. 11B, the percentage of water passing through the distal section diminishes with an increased proportion of openings to floor area; with the value achieved at 5.2% being approximately double that obtained at 12%. Therefore, using a ratio of approximately 5% provides an improved distribution of water in the container and accordingly optimal conditions for water chilling.

Ice Retention

When ice is used in combination with water chilling, ice loss must be considered when determining the optimum size of the opening in the walls of the container. Again, as described above, 4 different plates with different widths of openings: 3.175 mm, 6.35 mm, 9.525 mm and 12.7 mm, were used to study ice loss. Each of the plates had a 25% proportion of openings to total surface area. Four different ice sizes were used: 2.08 mm, 3.18 mm, 4.51 mm, and 6.38 mm. For each type of ice, the ice was in a 50% mixture with water at 0° C.

The manufacture of a support was necessary to recover the ice which passes through the slits. This support consists of a galvanized, steel pipe 300 mm in diameter by 230 mm in length. A plywood ring, 19 mm thick by 19 mm wide, was made to hold the Lexan plates in position, ensuring that the water and ice did not have any other path to escape, other than the slits through the plates.

The ice and water passing through the slits were filtered with the aid of a metal grill having squared openings of 1.5 mm×1.5 mm situated in the base of the steel pipe. After each test, a delay of 2 minutes was necessary to enable the excess water to be drained.

Figure 12:
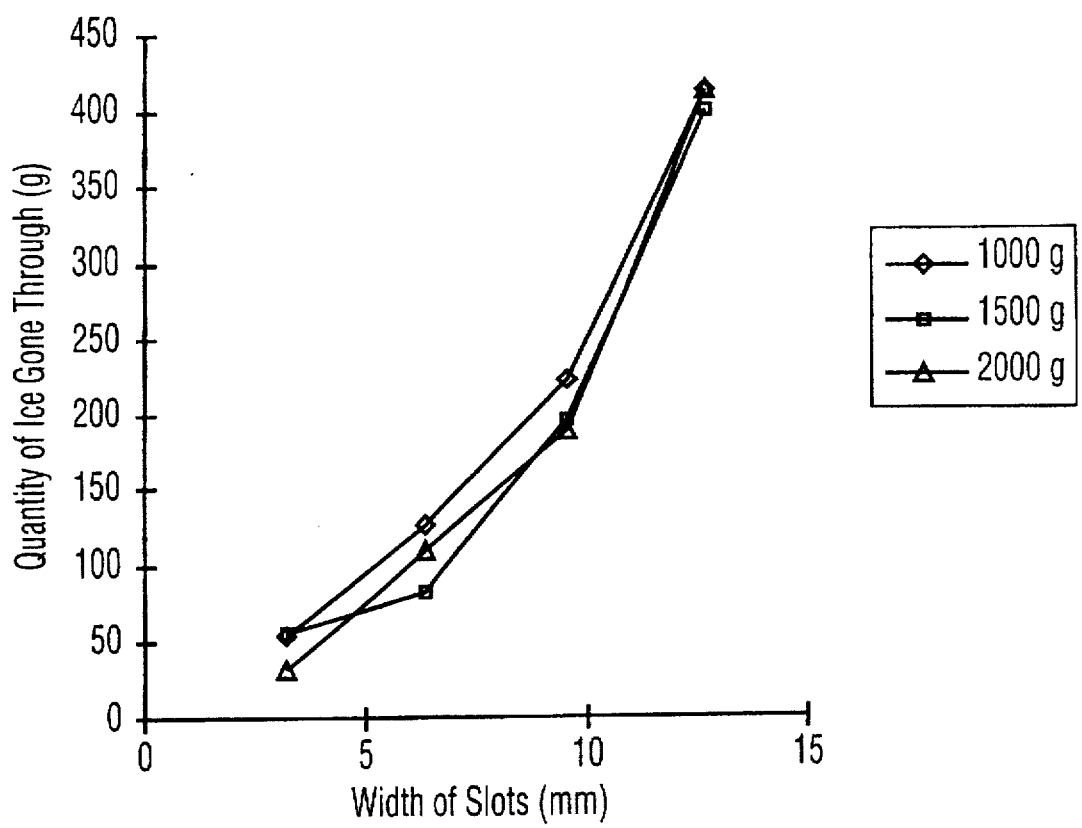
FIG. 12 shows the effect of the size of the ice and the width of the openings on ice loss.

As the ice water mixture comes in contact with the plates, some ice and water will flow through the openings. For each test the ice passing through the openings was weighed after two minutes of draining. Over time, the ice will form a bridge across the openings and ice loss will be reduced. If the opening is large and the ice is small, more ice will be lost from the container. FIG. 12 shows this relationship.

Figure 13:
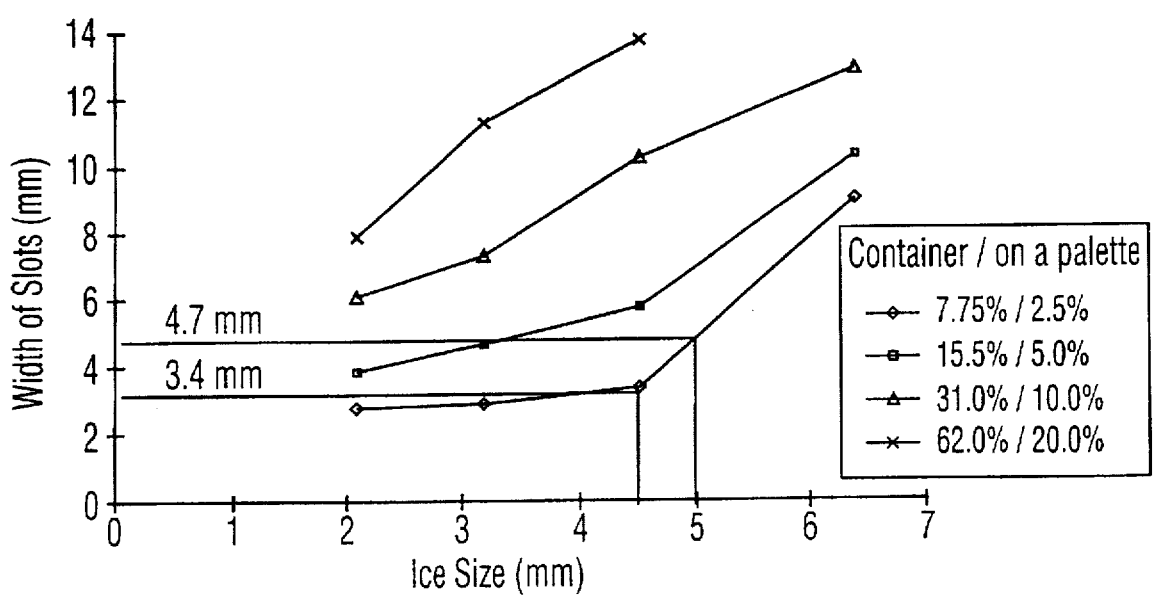
FIG. 13 shows the ice loss from a container with the proportion of openings at 25% and an opening width in the range from about 3.4 mm to about 4.7 mm.

FIG. 13 shows the ice loss from a container with the proportion of openings at 25% and an opening width in the range from about 3.4 mm to about 4.7 mm. An acceptable ice loss rate of between about 2.5% and 4% of ice of granule size of 4.5 to 5 mm was observed.

Bottom Design and Its Influence on Soil Accumulation

Most of the containers have ribs at the bottom in order to improve the strength of the container. However, these ribs may facilitate soil accumulation under the container. Eventually, this accumulation will increase the amount of soil entering the container and thus contaminating the product. The determination of the optimum design of the ribs, as well as the opening, at the bottom of the container may eliminate or significantly reduce the amount of soil trapped under the container. Two different tests were done to determine the best design for the bottom of the container.

Vertical Compression (Static Charge)

The first test was designed to study the effect of vertical compression on the bottom of the container. This test was designed to represent a full container sitting on the ground during harvest. A weight of 20 kg was applied on 7 different bottom designs, described below, for a period of 5 minutes. Dry and wet soil was used for each test. Before measuring the mount of soil trapped on the container, the container received a light shake to allow free soil to detach from the bottom. The rest of soil was taken from the bottom and weighed.

Lateral Movement (Dynamic Charge)

The second test was designed to study the effect of a lateral movement of the container on the mount of trapped soil. This test was designed to represent a container that is moved along the ground during harvest. A weight of 10 kg was applied on 7 different bottom designs, described below, and moved for a distance of 1.5 m. Dry and wet soil was used for each test. Before measuring the amount of soft trapped on the container, the container received a light shake to allow free soil to detach from the bottom. The rest of the soil was taken from the bottom and weighed.

Soil

The soil used for the test was a sandy soil with clay and 10% organic matter. The wet soil was made by adding the equivalent of 3 mm of rain on the ground.

Description of the bottoms

| Name | Openings | Ribs |
|------|----------|------|
| F1 | diagonal opening 3 mm large | Diagonal 40 mm C/C 2 mm height |
| F2 | longitudinal opening 8 mm large | Diagonal and straight, 10 mm height |
| F3 | longitudinal opening 6 mm large | None |
| F4 | Square 18 mm side | Squared 65 mm C/C, 6 mm height |
| F5 | diagonal opening 14 mm large | Diagonal, double 3 mm 45 mm C/C, 5 mm height |
| F6 | None | Diagonal and straight, 10 mm height |
| F7 | lateral opening 3.175 mm and groves 5 mm with opening 2 mm 2 mm large | None (grove) 9 mm height |

The amount of soil trapped in these two tests are shown below in Tables 8 and 9.

TABLE 8

The amount of soil, in grams, trapped under the container in the static test

|    | DRY SOIL | WET SOIL |
|----|----------|----------|
| F1 | 0.3 | 0.3 ± 0.0 |
| F2 | 0.2 | 0.65 ± 0.21 |
| F3 | 1.7 | 1.65 ± 0.35 |
| F4 | 0.1 | 0.65 ± 0.21 |
| F5 | *** | 0.9 |
| F6 | *** | 0.9 |
| F7 | *** | 0.3 |

TABLE 9

The amount of soil, in grams, trapped under the container in the dynamic test

|    | DRY SOIL | WET SOIL |
|----|----------|----------|
| F1 | 6 | 200.6 ± 46.0 |
| F2 | 12.3 | 41.7 ± 18.9 |
| F3 | 59.8 | 205.4 ± 33.3 |
| F4 | 24.1 | 113.8 ± 31.8 |
| F5 | *** | 332.0 ± 41.8 |
| F6 | *** | 33.4 ± 0.7 |
| F7 | *** | 44.0 ± 7.1 |

Thus, from these findings it is concluded that the width of the openings should be as small as possible. More specifically, a width of 3.175 mm is preferred in order to prevent or significantly reduce the accumulation of soil inside the container. The length of the opening should be oriented in the direction of the pull in order to reduce the amount of soil entering inside the container. The part of the bottom exposed to the soil (the ribs) should have an opening in order to prevent soil from becoming trapped. The absence of an opening creates a suction effect that makes removal of the soil with washing difficult. The angles at the intersection of ribs should be as large as possible in order to limit the mount of soil trapped. It is preferred that the bottom of the container have ribs, to elevate the bottom of the container slightly from ground level. This will prevent or reduce soil accumulation in the container.

The Design of the Bottom of the Container and the Effect on the Produce Following Vibration and Impact Tests Vibration trials were performed using an amplitude of ½ inch and with a frequency of 7 Hz for a duration of ½ hour. This amplitude and frequency are either greater than or similar to that found in a real situation. The duration of ½ hour corresponds to a travel time of 2 hours.

The produce chosen for this test were tomato, bell pepper, broccoli and iceberg lettuce. The choice was based on their susceptibility to damage during handling. The trials were performed at 1° C. for broccoli and iceberg lettuce, 10° C. for bell pepper and 13° C. for tomato.

The produce were marked and placed in one layer inside the container. The interior sides of the container were covered with 2 inch thick foam. Each product was also separated with foam. This ensured that the effect of vibration only on the bottom of the produce was determined in these studies. Also, a weight (acrylic plate covered with foam), equivalent of the weight of the produce usually placed over the first layer, was placed on top of the single layer of produce. The method of placement of the produce is shown in Table 10 below, and was chosen to assure the placement of the products in their most fragile position.

TABLE 10

Number of products placed on the bottom of containers, of two different sizes, and their position

| Product | 16 in. × 24 in. | 12 in. × 16 in. | Position |
|---------|-----------------|-----------------|----------|
| Tomato | 10 | 8 | Head up |
| Bell Pepper | 6 | 6 | Up and on side |
| Broccoli | 3 | 3 | On side |
| Iceberg lettuce | 6 | 4 | Head down |

Figure 14:
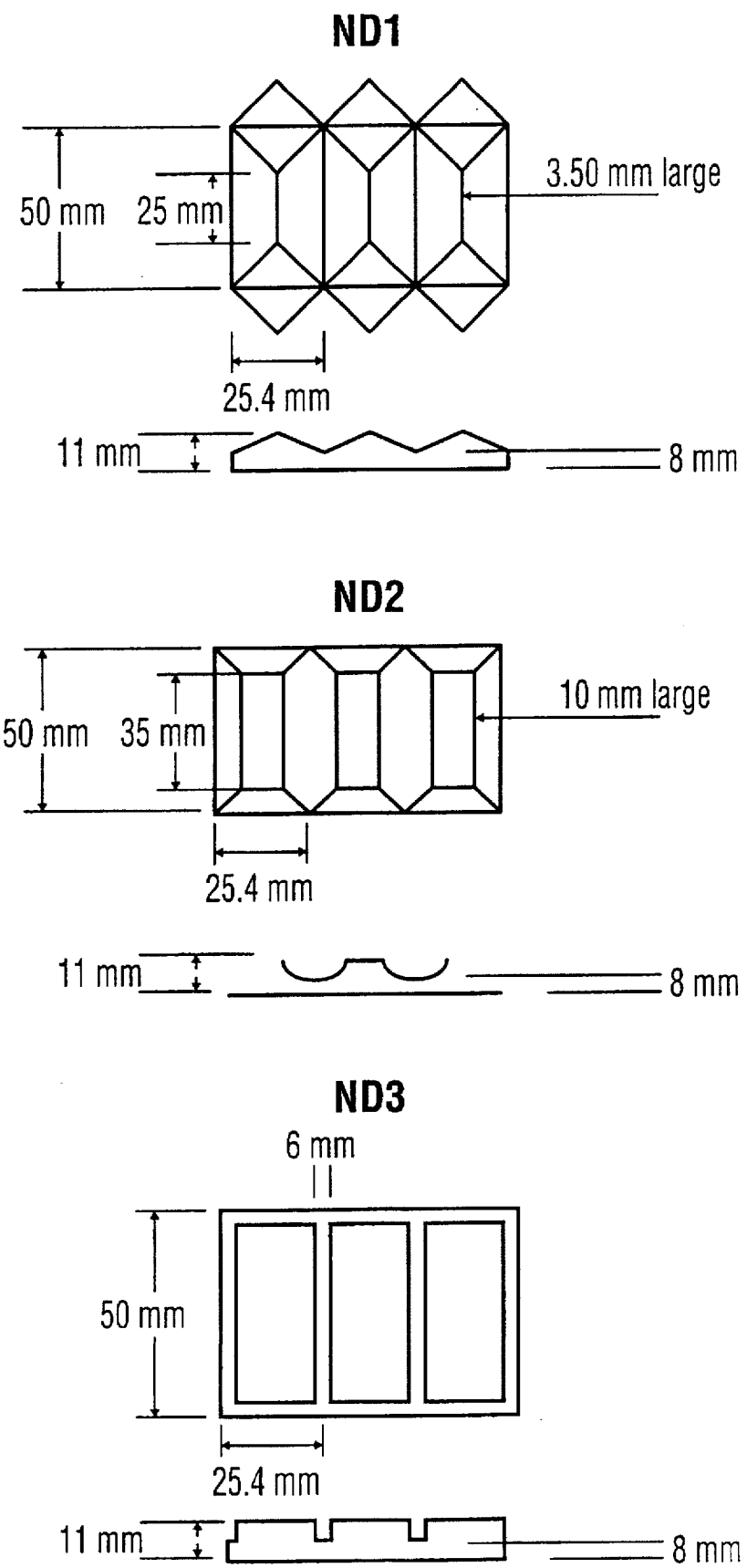
FIG. 14 shows the shape of the bottom of the containers in certain embodiments of the present invention.

A description of the openings and the bottom type of the containers tested is shown below, and ND1, ND2 and ND3 are depicted in FIG. 14.

Bottoms used
Description of the bottoms

| Name | Openings | Bottom Type |
|------|----------|-------------|
| F4 | Square 8 mm side | Flat |
| F6 | None | Planar with slopes smaller than 6 % |
| F7 | Lateral opening 3.175 mm and groves 5 mm with opening 2 mm large | Flat |
| ND1 | None | Groves (1 in. large × ⅛ in. depth) |
| ND2 | None | Undulations (1 in. large × ¼ in. depth) |
| ND3 | None | Groves (¼ in. large × ¼ in. depth) |

Before the trials, each product was carefully inspected in order to observe any damage on the surface. If damage was found, a mark was made to identify the location. Each product was weighed and placed in the container.

Products were stored at a higher storage temperature in order to accelerate the process of deterioration. For tomato and bell pepper, the storage temperature was 20° C., and 10° C. for lettuce and broccoli. Each product was inspected for specific damages.

Each vibration test was repeated three times. After each test the produce were inspected for damage. A description of the types of damage found on tomatoes is shown below.

| Description of Damage to Tomatoes | |
| --- | --- |
| Circular bruises | Soft circular area |
| | small: <1 cm |
| | medium: between 1 and 2 cm |
| | large: >2 cm |
| Bottom marks | Marks made by opening in the bottom |
| | Depend from the design |
| | short: <1 cm |
| | long: > = 1 cm |
| Cracks | Opened cuts or holes |
| Linear bruises | Soft longitudinal area |
| Serious damages | More than 50% of the product affected |
| | Unsellable |

Depending on the type of bottom used to perform the tests, differences were observed in the amount of damage sustained by the tomatoes (Table 11). For example, tomatoes placed in F6 and ND1 containers showed less damage than those placed in F4 and F7 containers.

Particular types of damage were predominant depending on the type of bottom used. Thus, tomatoes placed on a bottom with large slits (F4) presented mainly bottom type marks, as noted above. Bottoms F7, ND2 and ND3 caused mainly circular bruising.

TABLE 11

Summary of damage sustained by tomatos during vibration tests with various types of container bottoms.

| Type of | Circular Bruising bottom | | | Bottom Marks | | | Linear Bruis- | Sever |
| --- | --- | --- | --- | --- | --- | --- | --- | --- |
| | minor | medium | large | short | long | Cracks | ing | Damage |
| F6 | 5 | 3 | 0 | 1 | 1 | 3 | 0 | 0 |
| F4 | 8 | 1 | 0 | 24 | 25 | 0 | 0 | 0 |
| F7 | 28 | 21 | 3 | 13 | 1 | 0 | 16 | 2 |
| ND1 | 6 | 5 | 0 | 5 | 5 | 2 | 0 | 1 |
| ND2 | 15 | 2 | 5 | 5 | 3 | 0 | 2 | 1 |
| ND3 | 11 | 10 | 2 | 4 | 3 | 1 | 7 | 0 |

In summary, from the vibration tests with tomatoes, it was concluded that those container bottoms with openings (F4 and F7) are less favourable since they cause more serious damage than those without openings.

The impact trials were performed to simulate handling abuses during transportation. For each trial the product was attached to the bottom and dropped from a height of 0.5 m.

The products chosen for this test were tomato, bell pepper, broccoli and iceberg lettuce. The choice of these products was based on their susceptibility to be damaged during handling. The trials were performed at 1° C. for broccoli and iceberg lettuce, 10° C. for bell pepper and 13° C. for tomato.

The products were marked and placed in one layer inside the container. The interior sides of the container were covered with 2 inch thick foam in order to avoid contact of the product with the sides of the container. Each product was also separated with foam in order to prevent damage between products. All these procedures were followed to ensure that only the effects of the container bottom on the products were being studied. In addition, each product was attached to the bottom with tape in order to prevent the product from bouncing and also to force the product to have full contact with the bottom during impact. The placement of the products on the bottom of the containers is described in the previous section and was chosen to place the products in their most fragile position.

Damage evaluation methods used were the same as those presented for the vibration tests.

After impact tests, tomatoes showed similar braising to those described in Table 11. Damages observed immediately after the test did not change significantly regardless of the type of bottom used. After 24 hours of storage, at ambient temperature, damage to the product remained unchanged and tended to blur and disappear. For a 50 cm fall, no significant difference was found between the different types of bottoms. No conclusions could be drawn from the impact tests as the difference in the amount of produce damaged for the various bottoms tested was not significant.

Table 12 outlines the different types of damage caused by the vibration and impact tests preformed using bell peppers.

TABLE 12

| Types of damage caused by impact or vibration in bell peppers | |
| --- | --- |
| Bruising | Soft circular area |
| Bottom marks | Stamped container bottom lines |
| Internal break | Pepper flesh is cut without any skin damage |
| | Recognized by a whitish line |

An internal break does not show up immediately after the impact, but only after 24 hours storage.

Table 13 shows the results of the vibration tests with bell peppers.

TABLE 13

Effect of container botton on damage sustained by sweet peppers during vibration tests.

| Type of container | Bottom characteristics | After vibration | After 24 hours |
| --- | --- | --- | --- |
| F6 | Flat | — | — |
| F4 | Large slits | 6 bottom marks 3 bruising | 1 internal crack |
| F7 | Narrow slits, perforated channels, flat, straight channels, ¼" × ¼" | 1 bottom mark 1 bruising | 1 internal crack |
| ND1 | triangular, 1" × ⅛" | — | 3 internal cracks |
| ND2 | waved, 1" × ¼" | — | 6 internal cracks |
| ND3 | flat, straight channels, ¼" × ¼" | — | 1 slight internal crack |

Table 14 shows the results for impact tests with bell pepper.

TABLE 14

Effect of container bottom on damage sustained by bell pepper during impact tests.

| Type of container | Bottom characteristics | After impact | After 24 hours |
| --- | --- | --- | --- |
| F6 | Flat | — | — |
| F4 | Large slits | 1 internal break | 2 bruising 1 crack |
| F7 | Narrow slits, perforated channels, flat, straight channels, ¼" × ¼" | 2 bruising | 2 internal cracks |
| ND1 | triangular, 1" × ⅛" | — | — |
| ND2 | waved, 1" × ¼" | — | 1 major internal crack |
| ND3 | flat, straight channels, ¼" × ¼" | — | 1 slight bruising |

In summary, for the bell pepper experiments in both the vibration and impact tests, the different container bottoms showed little effect on bruising development. In fact it was difficult to detect any significant difference between the effect of the various container bottoms. However, the container bottoms with openings in F4 and F7 did cause slight damage to the peppers immediately after vibration or impact. Therefore, the flat bottom containers without openings (F6 and ND3) appear to be more appropriate and thus recommended, since bell peppers in these containers showed practically no damages.

The results of the vibration and impact tests for broccoli follow. When the container bottoms were checked following the vibration tests, it was noted that flower losses were very minimal. These observations were confirmed by weight loss measurements which showed a loss of less than 0.7% (fresh weight) of broccoli (Table 15). Flower examination after the vibration tests showed that bottoms F7 and ND2 caused more damage to the flowers in the external part of the florets. The product weight loss caused by this type of bottom was greater than that caused by the other types. During the 24 hour storage period at 10° C. which followed, the product did show a loss in weight; however, this loss was attributed to normal product transpiration.

TABLE 15

Average weight loss and damage to broccoli following vibration tests

| Type of container | Bottom characteristics | Weight loss after vibration (%) | Weight loss after 24 hours (%) | Observations |
|---|---|---|---|---|
| F6 | Flat | 0,04 | 2.85 | Very slight damage |
| F4 | Large slits | 0,09 | 1.76 | Very slight damage |
| F7 | Narrow slits, perforated channels, flat, straight channels, ¼" × ¼" | 0,63 | 2.92 | Flowers in exterior rows of the florets are crushed |
| ND1 | triangular, 1" × ⅛" | 0,11 | 1.82 | Very slight damage |
| ND2 | waved, 1" × ¼" | 0,37 | 1.99 | Flowers in exterior rows of the florets are crushed |
| ND3 | flat, straight channels, ¼" × ¼" | 0,11 | 1.55 | Very slight damage |

In summary, from the vibration tests with broccoli, it was shown that the F7 and ND2 container bottoms caused more damage to the flowers.

In the experiments with iceberg lettuce there was no noticible damage (e.g. bruising) following the vibration tests. Furthermore the lettuce weight loss (Table 16) after vibration testing and after 24 hours of storage could be attributed to normal water loss for lettuce. No partial or total leaf loss was observed. For the vibration tests, the container bottom had no significant effect on damage caused to lettuce.

TABLE 16

Average weight loss in lettuce following vibration tests

| Type of container | Bottom characteristics | Weight loss after vibration (%) | Weight loss after 24 hours (%) |
|---|---|---|---|
| F6 | Flat | 0.64 | 1.40 |
| F4 | Large slits | 0.31 | 1.82 |
| F7 | Narrow | 0.40 | 2.09 |

TABLE 16-continued

Average weight loss in lettuce following vibration tests

| Type of container | Bottom characteristics | Weight loss after vibration (%) | Weight loss after 24 hours (%) |
|---|---|---|---|
| | slits, perforated channels, flat, straight channels, ¼" × ¼" | | |
| ND1 | triangular, 1" × ⅛" | 0.16 | 1.36 |
| ND2 | waved, 1" × ¼" | 0.04 | 2.34 |
| ND3 | flat, straight channels, ¼" × ¼" | 0.03 | 1.01 |

After the impact tests, the damaged leaves were removed from the lettuce, resulting in significant weight loss. It was noted that for the same type of bottom, the weight loss was variable depending on the number of repetitions.

From the results of the vibration and impact tests, it was determined that those containers having flat bottoms with no openings were the most suitable as they caused little or no damage to the produce. However, these findings are not consistent with earlier studies, which showed that for effective cooling of the produce the containers must have openings at the bottom. As the radius of the side of the openings was responsible for some of the damage, it was thus necessary to study the curvature of the openings in order to effectively reduce the damage to the produce in a container having bottom openings.

Curvature of the Openings

Figure 15:
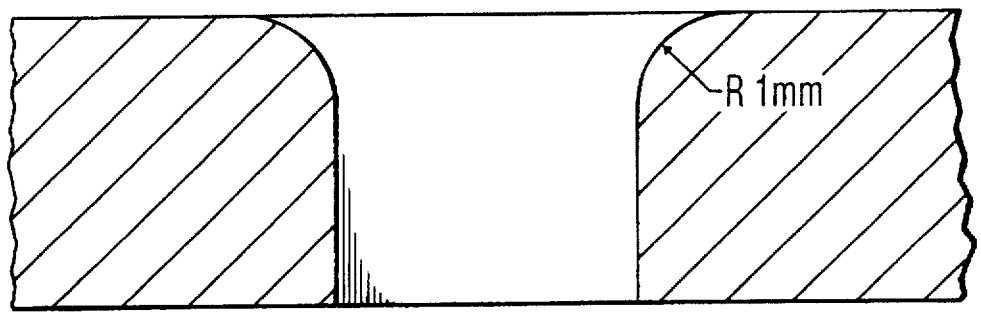
FIG. 15 shows an example of the edge of the openings on the containers of the present invention.

Vibration tests were carried out to evaluate the influence of the radius of openings in the base of containers on the type and/or extent of damage done to horticultural products. Three types of sizes were tested: openings with a radius of 0, 1/32" (0.8 mm) and 1/16" (1.6 mm). An example of the edge of the openings is illustrated in FIG. 15.

Openings having a radius of 0 led to a low number of circular bruises, comparable to those found with the radius of 1/16. However, the number of markings on the base was quite high and was, in particular, attributable to the presence of numerous long marks. However, it was with the radius of 0 that the total product losses were the least significant. The results are shown in Table 17.

TABLE 17

Estimation of damage to tomatoes as a function of the radius of the openings in vibration tests

| Type of damage | | Radius = 0 | Radius = 0.8 mm | Radius = 1.6 mm |
|---|---|---|---|---|
| Circular Bruise | Small | 2 | 5 | 5 |
| | Medium | 17 | 21 | 12 |
| | Large | 12 | 16 | 10 |
| | Total | 31 | 42 | 27 |
| Mark on the Bottom | Short | 11 | 29 | 11 |
| | Long | 27 | 14 | 15 |
| | Total | 38 | 43 | 26 |
| Total Loss | | 2 | 3 | 2 |
| | | | | 7 |
| | | | 1 | 1 |
| | Total | 2 | 4 | 10 |

From these studies, it is preferable to have the radius of the edges of the openings range from 0 to 0.8 mm.

Stacking Arrangement

Figure 16:
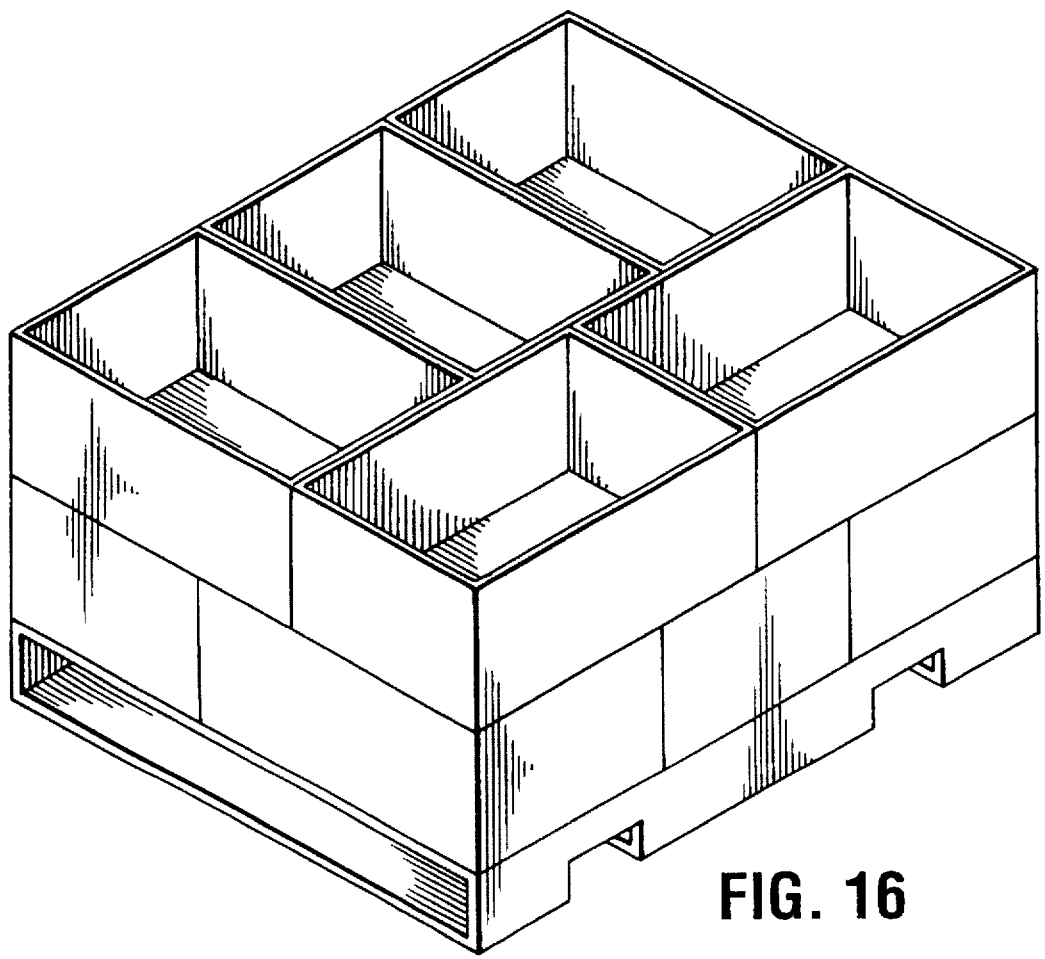
FIG. 16 shows the placement of five containers of the present invention on a standard pallet.

The containers of the present invention, as discussed above, are adapted to be stacked for transport and storage. In a standard pallet, the containers are sized to allow for five containers on a pallet. It is preferred that the containers are placed three on one side of the pallet and two on the other side, with the containers on the two sides placed in opposite orientation, as shown in FIG. 16. The second level of containers are then placed in a cross-stacked orientation, from the first level. With a cross-stacked orientation, there is better utilization of the cooling fluid. Without cross-stacking, the cooling fluid flows through the column which is formed when one container is stacked on top of another. With cross-stacking, when water is used as a cooling fluid, it is possible to recover about 50% of the water loss through the sides to be used in the containers below.

Positioning of the Openings on the Container Walls and Floor

Figure 17:
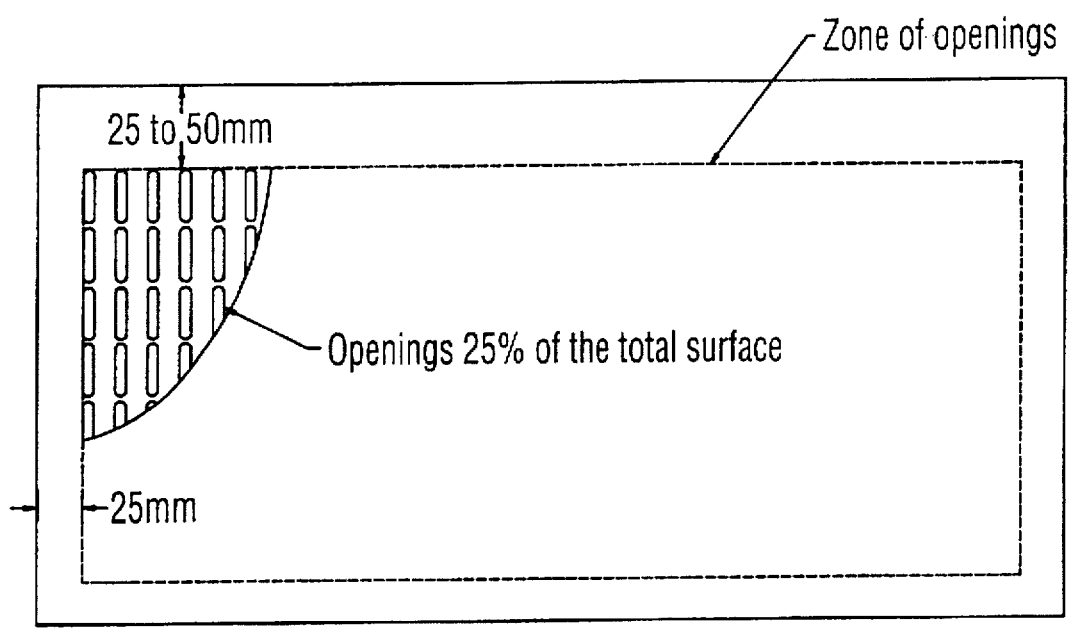
FIG. 17 shows an example of a wall of the container of the present invention, depicting a border around with no openings.

According to the present invention, it was found that the produce will cool faster if there are no openings in the top area of the walls of the container. It was found to be preferable if there was a 25 mm to 50 mm border around the walls with no openings. In one embodiment of the present invention there is a 25 mm border around the sides and bottom of the walls and a 25 mm to 50 mm border at the top of the wall of the container with no openings. This is shown in FIG. 17.

Figure 18:
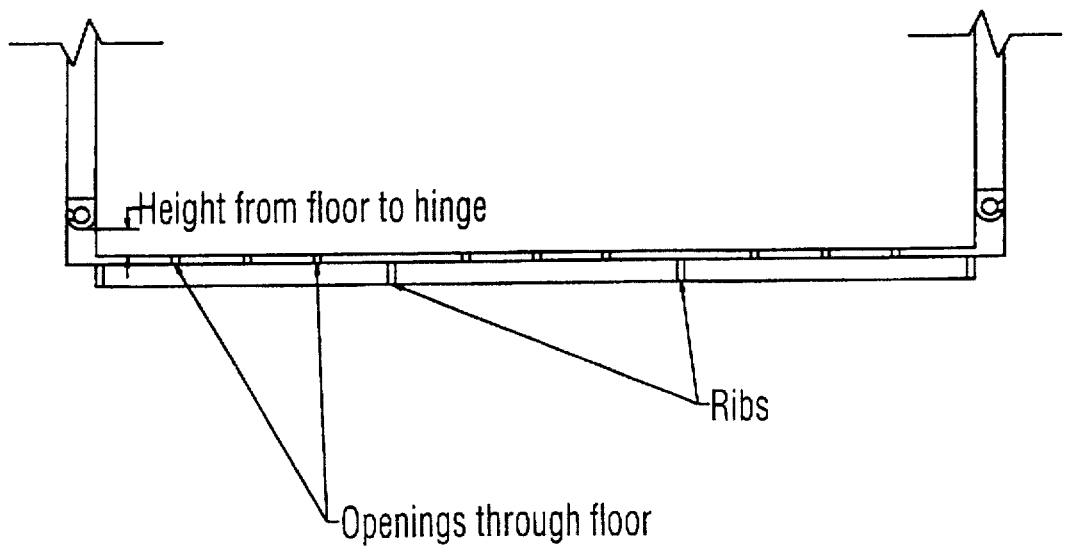
FIG. 18 is a cross-sectional view of one embodiment of the invention showing the details of the floor.

In summary, according to the present invention, there is provided a container comprising a floor portion and four wall portions adapted for transport and storage of fruit and vegetables. A cross-sectional view of the bottom and partial side panels of one example of the container of the present invention is shown in FIG. 18. The container of the present invention has been adapted to provide efficient cooling using either air or water, with or without the use of ice. Taking into consideration the fluid flow (air or water), water distribution and ice retention, a container with the following characteristics was developed.

Walls 1) vertical
2) proportion of the walls that are open: 20% to 30%, preferably 25%
3) width of the openings: 3.175 mm to 12.7 mm, preferably 3.4 mm to 4.7 mm
4) openings have a curved edge, with up to 0.8 mm inch radius

Floor 1) width of the openings: smaller than or equal to 3.175 mm
2) length of the openings is not critical, although they should be at least 6.35 mm long, preferably from 6.35 mm to 40 mm long
3) proportion of the floor that is open: 3.5% to 5.5%
4) openings have a curved edge, with up to 0.8 mm inch radius The container of the present invention is preferably a plastic container, as such a container is more durable, particularly when water cooling, including ice, is used in storage or transport. Any plastic container, as described in the prior art, can be adapted according to the present invention to provide a container with openings of a defined size and proportion to optimize air and water circulation and water distribution. Examples of such plastic containers include those described in U.S. Pat No. 4,105,117; U.S. Pat. No. 5,366,107; Canadian Patent application 2,155,783 and U.S. Pat. No. 5,515,987, all of which are incorporated by reference.

The present invention has been described with regard to preferred embodiments. However, it will be obvious to persons skilled in the art that a number of variations and modifications can be made without departing from the scope of the invention as described in the following claims.

The embodiments of the invention is which an exclusive property of privilege is claimed are defined as follows:

1. A produce container comprising a horizontal floor portion and four adjoining vertical wall portions, wherein the floor portion comprises a plurality of openings smaller than or equal to 3.175 mm in width and from 6.35 mm to 40 mm in length, said openings covering approximately 3.5% and 5.5% of the container floor, and wherein each of said wall portion comprises a plurality of openings from 3.175 mm to 12.7 mm in width and from 6.35 mm to 40 mm in length, said openings covering approximately 20% and 30% of said container wall portion.

2. The container of claim 1, wherein the openings on the floor are from about 1.5975 mm to about 3.175 mm in width.

3. The container of claim 2, wherein the openings on the floor are about 3.175 mm in width.

4. The container of claim 2, wherein the openings on each of said wall portion is from about 3.4 mm to about 4.7 mm in width.

5. The container of claim 4, wherein the openings on the wall portions cover about 25% of the container wall portion.

6. The container of claim 5, wherein the wall portions are hinged and collapsible, the said wall portions being hinged at a height of between 4.5 mm and 40 mm from the floor portion of the container.

7. The container of claim 6, wherein the openings on the floor portion represent about 3.5% of the floor portion surface when said hinges are at a height of about 20 mm from the floor portion of said container.

8. The container of claim 6, wherein the openings on the floor portion represent about 5.5% of the floor portion surface when said hinges are at a height of about 10 mm from the floor portion of said container.

9. The container of claim 8, wherein the openings on said floor portion extend in a longitudinal direction thereof.

10. The container of claim 9, wherein each of said floor portion and wall portions has an inner face which is planar.

11. The container of claim 10, wherein each of said openings defines, on said inner face of said wall and floor portion, a curved edge having a radius of less than 1 mm.

12. The container of claim 11, wherein the openings have a curved edge having a radius of about 0.8 mm.

13. The container of claim 12, wherein said floor portion has a peripheral opening-free border area of about 25 mm.

14. The container of claim 13, wherein each of said wall portions have a peripheral opening-free border area of about 25 mm.

15. The container of claim 14, wherein said side wall portions have a peripheral opening-free border area of about 25 mm on said side portions and bottom portion of said wall portion, and about a 50 mm on said top of said wall portion.

* * * * *